United States Patent [19]

Schwartz et al.

[11] 3,815,122

[45] June 4, 1974

[54] DATA CONVERTING APPARATUS

[75] Inventors: William F. Schwartz, Marlton; Robert W. Butler, Cherry Hill, both of N.J.

[73] Assignee: GTE Information Systems Incorporated, Stamford, Conn.

[22] Filed: Jan. 2, 1973

(Under Rule 47)

[21] Appl. No.: 320,455

[52] U.S. Cl. .................... 340/347 DD, 340/174.1 G

[51] Int. Cl. .................... H04l 3/00

[58] Field of Search ............340/347 DD, 174.1 G, 340/174.1 H; 346/74 M

[56] References Cited

UNITED STATES PATENTS

| | | | |
|---|---|---|---|
| 3,374,475 | 3/1968 | Gabor | 340/174.1 H |
| 3,422,425 | 1/1969 | Vallee | 340/347 DD |
| 3,488,662 | 1/1970 | Vallee | 346/74 M |
| 3,560,947 | 2/1971 | Francaini | 340/174.1 H |
| 3,623,041 | 11/1971 | MacDougall, Jr. | 340/347 DD |
| 3,671,960 | 6/1972 | Sollman et al. | 340/347 DD |
| 3,678,503 | 7/1972 | Sollman | 340/347 DD |
| 3,697,977 | 10/1972 | Sollman et al. | 340/347 DD |
| 3,705,398 | 12/1972 | Kostenbauer et al. | 340/347 DD |

*Primary Examiner*—Charles D. Miller
*Attorney, Agent, or Firm*—Norman J. O'Malley

[57] ABSTRACT

A data converting apparatus for converting NRZ (non-return-to-zero) encoded signals to double density encoded signals. The data converting apparatus of the invention includes a first flip-flop operative to receive and store in succession the bits comprising an NRZ encoded signal, and a second flip-flop operative to receive and store in succession the bits stored in the first flip-flop. When a 1 bit is stored in the first flip-flop, a NAND gate coupled to the first flip-flop and to a first source of clock pulses operates, in response to a clock pulse from the first source of clock pulses, to produce an output pulse. This output pulse occurs at a time corresponding to the end of the bit period in which the 1 bit is present in the NRZ encoded signal. When a 0 bit is stored in the first flip-flop and no 1 bit is stored in the second flip-flop, a second NAND gate coupled to the two flip-flops and to a second source of clock pulses operates, in response to a clock pulse from the second source of clock pulses, to produce an output pulse. This output pulse occurs at a time corresponding to the center of the bit period in which the 0 bit is present in the NRZ encoded signal. When a 0 bit is stored in the first flip-flop simultaneously with a 1 bit being stored in the second flip-flop, no output pulses is produced by the second NAND gate. The output pulses produced by the two NAND gates are converted to an output signal, representing a double density encoded signal, in which the transitions occur at times corresponding to the times of occurrence of the output pulses produced by the two NAND gates.

7 Claims, 15 Drawing Figures

DATA CONVERTING APPARATUS

BACKGROUND OF THE INVENTION

The present invention relates to a data converting apparatus and, more particularly, to a data converting apparatus for converting NRZ (non-return-to-zero) encoded signals to double density encoded signals.

It is sometimes desirable, for example, in writing NRZ encoded signals onto a bulk storage medium (e.g., a storage drum), to first convert the NRZ encoded signals to double density encoded signals. Generally, the relationship between the two types of encoded signals is as follows:

*a.* For each 1 bit in a bit period of an NRZ encoded signal, a transition is provided in a corresponding bit period of a double density encoded signal at the end of the corresponding bit period;

*b.* For each 0 bit in a bit period of the NRZ encoded signal, except where a 0 bit follows a 1 bit, a transition is provided in a corresponding bit period of the double density encoded signal at the center of the corresponding bit period; and *c.* When a 0 bit in a bit period of the NRZ encoded signal follows a 1 bit, no transition is provided in the corresponding bit period of the double density encoded signal.

The present invention is directed to a data converting apparatus for converting an NRZ encoded signal to a double density encoded signal wherein the two types of signals have the relationships indicated hereinabove.

BRIEF SUMMARY OF THE INVENTION

Briefly, in accordance with the present invention, a data converting apparatus is provided for converting an NRZ encoded signal to a double density encoded signal. The NRZ encoded signal comprises bits, each having a first value or a second value, located in corresponding bit periods of the NRZ encoded signal. The data converting apparatus includes a first means operative to produce a first train of signals and a second means operative to produce a second train of signals displaced with respect to the first train of signals by a predetermined fraction of a bit period of the NRZ encoded signal. The data converting apparatus of the invention also includes a first storage means and a second storage means. The first storage means is adapted to receive the NRZ encoded signal and a third train of signals. The first storage means operates in response to the NRZ encoded signal and the third train of signals to store in succession the bits of the NRZ encoded signal. The second storage means is coupled to the first storage means and, like the first storage means, is adapted to receive the aforesaid third train of signals. The second storage means operates in response to the third train of signals to receive and store therein in succession the bits stored in the first storage means.

The data converting apparatus further includes a third means coupled to the first storage means and to the first means and a fourth means coupled to the first storage means, to the second storage means, and to the second means. The third means operates in response to a bit of the first value being stored in the first storage means, and also in response to a signal in the first train of signals produced by the first means having a first level, to produce an output signal. This output signal occurs at a time corresponding to a particular first point, for example, the end, of the bit period of the bit of the NRZ encoded signal stored in the first storage means. The fourth means operates in response to a bit of the second value being stored in the first storage means simultaneously with the absence of a bit of the first value in the second storage means, and also in response to a signal in the second train of signals produced by the second means having a first level, to produce an output signal. This output signal occurs at a time corresponding to a particular second point, for example, the center, of the bit period of the bit of the NRZ encoded signal stored in the first storage means. The fourth means further operates to prevent an output signal therefrom in response to a bit of the second value being stored in the first storage means simultaneously with a bit of the first value being stored in the second storage means. The output signals produced by the third and fourth means are received by a fifth means which operates in response to these signals to produce an output signal having transitions therein corresponding to the times of occurrence of the output signals produced by the third and fourth means. This output signal represents a double density encoded signal.

BRIEF DESCRIPTION OF THE DRAWING

Various objects, features, and advantages of a data converting apparatus in accordance with the present invention will be apparent from the following detailed discussion taken in conjunction with the accompanying drawing in which.

DETAILED DESCRIPTION OF THE INVENTION

Figure 1:
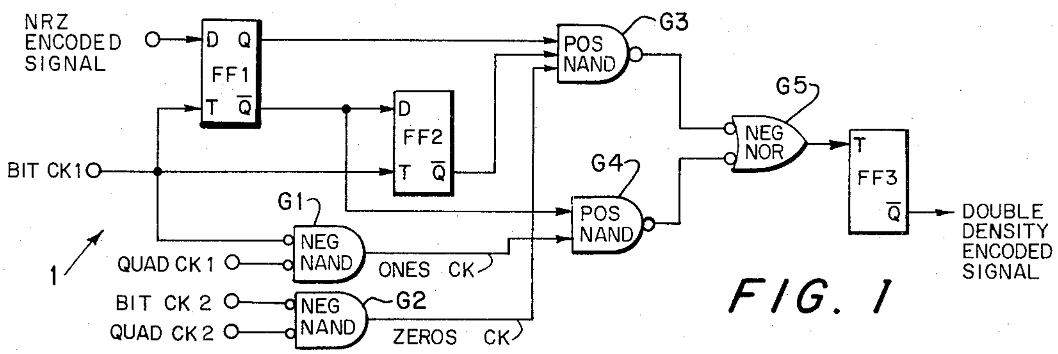
FIG. 1 is a schematic block diagram of a data converting apparatus in accordance with the present invention.
Figure 2:
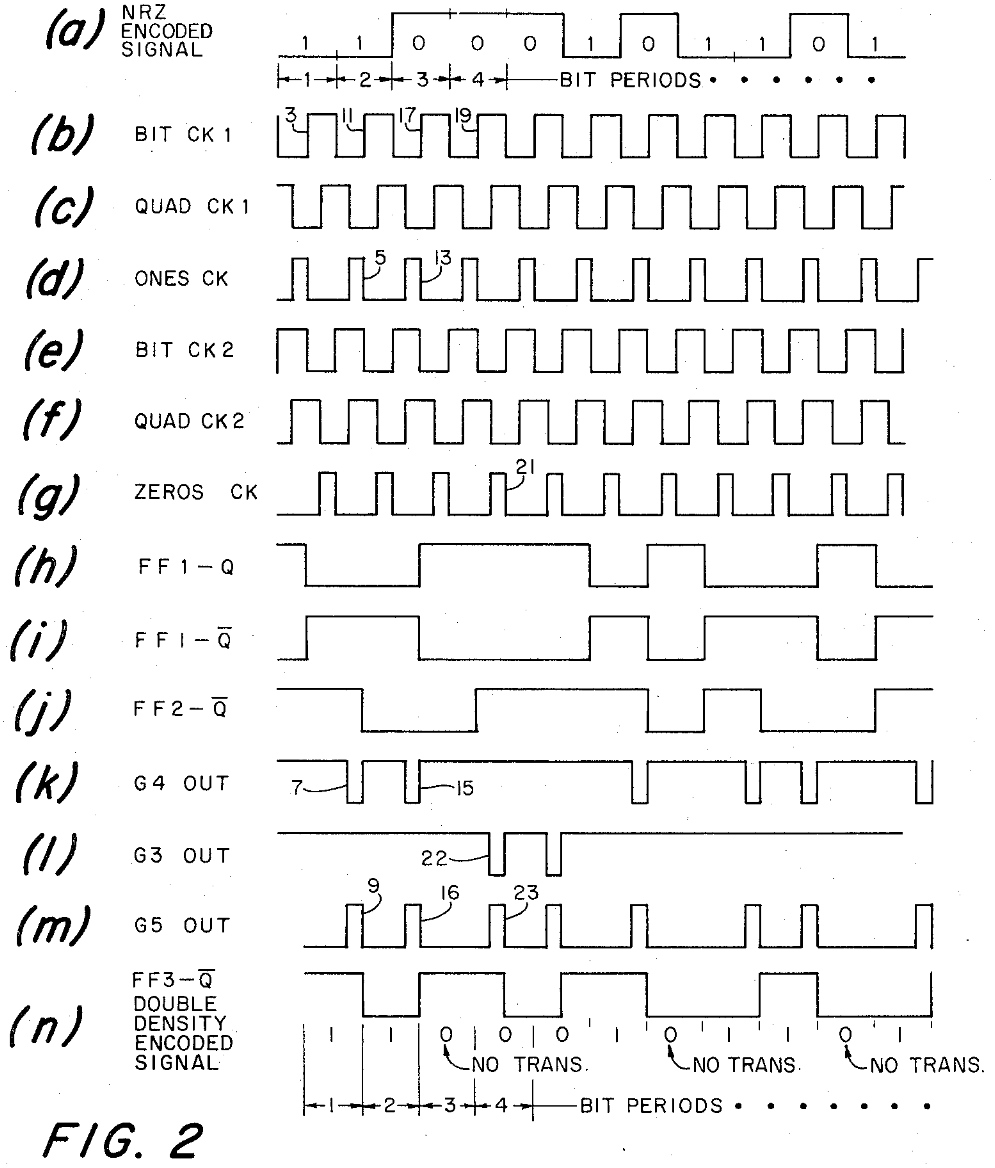
FIGS. 2(*a*)-2(*n*) are waveforms used to explain the data converting apparatus of FIG. 1.

Referring now to FIG. 1, there is shown a data converting apparatus 1 in accordance with the present invention. As shown in FIG. 1, the data converting apparatus 1 includes three flip-flops FF1, FF2, and FF3, a pair of negative NAND gates G1 and G2, a pair of positive NAND gates G3 and G4, and a negative NOR gate 65. The flip-flop FF1 has a data input D, a trigger input T, a first output Q, and a second output $\bar{Q}$. An NRZ encoded signal which is to be converted to a double density encoded signal by the data converting apparatus 1 of FIG. 1 is applied to the data input D of the flip-flop FF1. An exemplary form of such an NRZ encoded signal is shown in FIG. 2(*a*) and includes a plurality of 1 and 0 bits located in corresponding bit periods of the NRZ encoded signal. The several bits of the NRZ encoded signal applied to the data input D of the flip-flop FF1 are gated into and stored by the flip-flop FF1 in succession by means of successive clock pulses of a BIT CK1 pulse train applied to the trigger input T of the flip-flop FF1. A typical form of the BIT CK1 pulse train is shown in FIG. 2(*b*). The frequency of the BIT CK1 pulse train is selected in accordance with the invention to provide pulses each having a duration equal to one half the duration of a bit period of the NRZ encoded signal. The first output Q of the flip-flop FF1 is coupled to a first input of the NAND gate G3, and the other output Q is coupled to a first input of the other positive NAND gate G4 and also to a data input D of the flip-flop FF2.

The flip-flop FF2 also has a trigger input T, and an output $\bar{Q}$. The trigger input T of the flip-flop FF2, like the trigger input T of the flip-flop FF1, is adapted to receive successive clock pulses of the BIT CK1 pulse train. As a result, the several bits received and stored in the flip-flop FF1 are caused to be transferred in succession in the flip-flop FF2. Thus, the flip-flops FF1 and FF2 operate in the manner of a two-stage shift register. The output $\overline{Q}$ of the flip-flop FF2 is coupled to a second input of the positive NAND gate G3.

The negative NAND gate G1 has a first input adapted to receive the BIT CK1 pulse train of FIG. 2(*b*) and a second input adapted to receive a QUAD CK1 pulse train. The QUAD CK1 pulse train, a typical form of which is shown in FIG. 2(*c*), is of the same frequency as the BIT CK1 pulse train but is phase displaced with respect to the BIT CK1 pulse train by 90°, or one-quarter bit period. The negative NAND gate G1 operates in response to the BIT CK1 pulse train and the QUAD CK1 pulse train at its inputs to produce a ONES CK pulse train, as shown in FIG. 2(*d*). As indicated by FIGS. 2(*b*)-2(*d*), a positive pulse is produced in the ONES CK pulse train whenever the pulse trains at the inputs of the NAND gate G1 are both negative, or low. In a similar manner, as the negative NAND gate G1, the negative NAND gate G2 has a first input adapted to receive a BIT CK2 pulse train and a second input adapted to receive a QUAD CK2 pulse train. Typical forms of the BIT CK2 and QUAD CK2 pulse trains are shown in FIGS. 2(*e*) and 2(*f*), respectively. The BIT CK2 pulse train of FIG. 2(*e*) is of the same frequency as the BIT CK1 pulse train of FIG. 2(*b*) but is phase displaced with respect to the BIT CK1 pulse train by 180°, or one-half bit period. The QUAD CK2 pulse train of FIG. 2(*f*) is of the same frequency as the BIT CK2 pulse train of FIG. 2(*e*) but is phase displaced with respect to the BIT CK2 pulse train by 90°, or one-quarter bit period. The negative NAND gate G2 operates in response to the BIT CK2 pulse train and the QUAD CK2 pulse train at its inputs to produce a ZEROS CK pulse train, as shown in FIG. 2(*g* ). As indicated in FIGS. 2(*e*)-2(*g*), a positive pulse is produced in the ZEROS CK pulse train whenever the pulse trains at the inputs of the NAND gate G2 are both negative, or low. By virtue of the abovestated relationships between the BIT CK1, QUAD CK1, BIT CK2, and QUAD CK2 pulse trains, the ONES CK and ZEROS CK pulse trains are phase displaced with respect to each other by 180°, or one-half bit period. Each pulse of the abovedescribed ONES CK pulse train produced by the NAND gate G1 is applied to a second input of the positive NAND gate G4 and each pulse of the abovedescribed ZEROS CK pulse train produced by the NAND gate G2 is applied to a third input of the positive NAND gate G3.

The positive NAND gate G4 operates to produce a negative output pulse, such as shown, for example, in FIG. 2 (*k*), whenever the output $\overline{Q}$ of the flip-flop FF1 is high, that is, positive, and a pulse in the ones CK pulse train has been applied to the positive NAND gate G4 and is also high. As will be more readily apparent hereinafter, this output pulse, which is of the same duration as a pulse in the ONES CK pulse train, is produced by the NAND gate G4 only when the flip-flop FF1 has a 1 bit stored therein. In addition, the output pulse produced by the positive NAND gate G4 occurs at a time corresponding to the end of the bit period in which the 1 bit in the flip-flop FF1 is present. In a similar manner, the positive NAND gate G3 operates to produce a negative output pulse, such as shown, for example, in FIG. 2(1), whenever the output Q of the flip-flop FF1 and the output $\overline{Q}$ of the flip-flop FF2 are both high and a pulse in the ZEROS pulse train has been applied to the positive NAND gate G3 and is also high. As will also be more readily apparent hereinafter, this output signal, which is of the same duration as a pulse in the ZEROS CK pulse train, is produced by the NAND gate G3 only when the flip-flop FF1 has a 0 bit stored therein and no 1 bit is present in the flip-flop FF2 (that is, a 0 bit is present in the flip-flop FF2). In addition, the output pulse produced by the NAND gate G3 occurs at a time corresponding to the center of the bit period in which the 0 bit in the flip-flop FF1 is present. In the case of a 0 bit being stored in the flip-flop FF1 while a 1 bit is stored in the flip-flop FF2, no output pulse is produced by the NAND gate G3.

The negative NOR gate G5 operates to receive the negative pulses produced by the NAND gates G3 and G4, at first and second inputs thereof, and to invert and combine these pulses into a single pulse train, such as shown, for example, in FIG. 2(*m*). The pulses produced by the NOR gate 5 are applied to a trigger terminal T of the flip-flop FF3. The flip-flop FF3 operates in response to the output pulses produced by the NOR gate G5 to produce an output pulse train, such as shown, for example, in FIG. 2(*n*), at an output $\overline{Q}$ and having transitions therein corresponding to the trailing edges of the output pulses produced by the NOR gate G5. The output pulse train produced at the output $\overline{Q}$ of the flip-flop FF3 represents a double density encoded signal corresponding to the particular NRZ encoded signal shown in FIG. 2 (*a*).

The operation of the data converting apparatus 1 of FIG. 1 will now be described in greater detail with particular reference being made to the NRZ encoded signal shown in FIG. 2(*a*). The first bit of this signal, namely, a 1 bit, is applied to the data input D of the flip-flop FF1 and loaded into and stored in the flip-flop FF1 on the leading edge of the first pulse 3 in the BIT CK1 pulse train, FIG. 2 (*b*). At this time, the first output Q of the flip-flop FF1 goes low and the second output $\overline{Q}$ goes high, as shown in FIGS. 2(*h*) and 2(*i*), respectively. Also at this time, the output $\overline{Q}$ of the flip-flop FF2 is high, as shown in FIG. 2(*j*). While the output $\overline{Q}$ of the flip-flop FF1 is high, the BIT CK1 pulse train of FIG. 2(*b*) and the QUAD CK1 pulse train of FIG. 2(*c*) both become low (negative) at the same time and, as a result, a ONES CK pulse 5, FIG. 2(*d*), is produced by the negative NAND gate G1. With the output $\overline{Q}$ of the flip-flop FF1 high (positive) and the ONES CK pulse 5 also high, a negative output pulse 7, FIG. 2(*k*), is produced by the positive NAND gate G4. As shown in FIGS. 2(*i*) and 2(*k*), the trailing edge of the output pulse 7 occurs at the end of the bit period in which the 1 bit is present in the flip-flop FF1. No output pulse is produced by the positive NAND gate G3 while the 1 bit is present in the flip-flop FF1 inasmuch as the output $\overline{Q}$ of the flip-flop FF1 is not high (positive) during this time. The output pulse 7 produced by the NAND gate G4 is inverted by the negative NOR gate G5 to provide a pulse 9, FIG. 2(*m*), and the pulse 9 is applied to the trigger input T of the flip-flop FF3. The flip-flop FF3 is triggered on the trailing edge of this pulse 9 as a result of which the output $\overline{Q}$ goes from high to low, as indicated in FIG. 2(*n*). It is to be noted that this transition occurs at a time corresponding to the end of the bit period in which the 1 bit in the flip-flop FF1 is present.

Since the waveform at the output Q of the flip-flop FF1, FIG. 2(*h*), has the same configuration as the NRZ encoded signal, but phase displaced therefrom (by one-half bit period, the duration of a BIT CK1 pulse), the abovementioned transition at the output $\overline{Q}$ of the flip-flop FF3 also occurs at a time corresponding to the end of the first bit period in which the 1 bit is present in the input NRZ encoded signal.

On the loading edge of the next pulse 11 in the BIT CK1 pulse train, the second bit of the NRZ encoded signal, namely, another 1 bit, is loaded into the flip-flop FF1 and the preceding 1 bit in the flip-flop FF1 is loaded into the flip-flop FF2. Since there is no change in the value of the bit stored in the flip-flop FF1, the outputs Q and $\overline{Q}$ of the flip-flop FF1 remain the same, as indicated in FIGS. 2(*h*) and 2(*i*). However, the output $\overline{Q}$ of the flip-flop FF2 goes low at this time, as indicated by FIG. 2 (*j*). While the output $\overline{Q}$ of the flip-flop FF1 is high, the BIT CK1 pulse train, FIG. 2(*b*), and the QUAD CK1 pulse train, FIG. 2(*c*), both become low again and, as a result, another ONES CK pulse 13, FIG. 2(*d*), is produced by the negative NAND gate G1. With the output $\overline{Q}$ of the flip-flop FF1 high and the ONES CK pulse 13 also high, another negative output pulse 15, FIG. 2(*k*), is produced by the positive NAND gate G4. As shown in FIGS. 2(*h*) and 2(*k*), the trailing edge of the output pulse 15, as with the previous output pulse 7, occurs at the end of the bit period in which the second 1 bit in the flip-flop FF1 is present. Again, no output pulse is produced by the positive NAND gate G3 while the second 1 bit is present in the flip-flop FF1 inasmuch as the output Q of the flip-flop FF1 and the output $\overline{Q}$ of the flip-flop FF2 are both low during this time. The output pulse 15 produced by the NAND gate G4 is inverted by the negative NOR gate G5 to provide a pulse 16, FIG. 2(*m*), and the pulse 16 is applied to the trigger input T of the flip-flop FF3. The flip-flop FF3 is again triggered on the trailing edge of this pulse as a result of which the output $\overline{Q}$ goes from low to high, as indicated in FIG. 2(*n*). It is to be again noted that this transition also occurs at a time corresponding to the end of the bit period in which the second 1 bit in the flip-flop FF1 is present and, thus, to the end of the second bit period in which the second 1 bit is present in the NRZ encoded signal.

On the leading edge of the next pulse 17 in the BIT CK1 pulse train, the third bit of the NRZ encoded signal, namely, a 0 bit, is loaded into the flip-flop FF1 and the preceding 1 bit (second bit) stored in the flip-flop FF1 is loaded into the flip-flop FF2. With this transfer, the aforementioned special situation is established in the flip-flops FF1 and FF2 in which a 0 bit (in the flip-flop FF1) follows a 1 bit (in the flip-flop FF2). Since there is a change in the value of the bit stored in the flip-flop FF1, the output Q of the flip-flop FF1 goes high, FIG. 2(*h*), and the output $\overline{Q}$ goes low, FIG. 2(*i*). Also, since there is no change in the value of the bit stored in the flip-flop FF2, the output $\overline{Q}$ of the flip-flop FF2 remains low, FIG. 2(*j*). With the above conditions at the output Q of the flip-flop FF1 and the output $\overline{Q}$ of the flip-flop FF2, no output signal is produced by the positive NAND gate G3. Accordingly, no output signal is produced by the negative NOR gate G5 and the flip-flop FF3 is not triggered to provide another transition. Thus, as indicated by FIG. 2(*n*), no transition occurs at the output $\overline{Q}$ of the flip-flop FF3 when a 0 bit is present in the flip-flop FF1 and a 1 bit is present in the flip-flop FF2.

On the leading edge of the next pulse 19 in the BIT CK1 pulse train, the fourth bit of the NRZ encoded signal, namely, another 0 bit, is loaded into the flip-flop FF1 and the preceding 0 bit (third bit) stored in the flip-flop FF1 is loaded into the flip-flop FF2. Since there is no change in the value of the bit stored in the flip-flop FF1, the output Q of the flip-flop FF1 remains high and the output $\overline{Q}$ of the flip-flop FF1 remains low, FIGS. 2(*h*) and 2(*i*). There is a change in the value of the bit stored in the flip-flop FF2, however, and, as a result, its output $\overline{Q}$ goes high, FIG. 2(*j*). While the output Q of the flip-flop FF1 is high and while the output $\overline{Q}$ of the flip-flop FF2 is also high, the BIT CK2 and QUAD CK2 pulse trains, FIGS. 2(*e*) and 2(*f*), respectively, both become low (negative) at the same time. As a result, a ZEROS CK pulse 21 is produced by the negative NAND gate G2, FIG. 2(*g*). With the output Q of the flip-flop FF1 high, the output $\overline{Q}$ of the flip-flop FF2 high, and with the ZEROS CK pulse high, an output pulse 22, FIG. 2(*l*), is produced by the positive NAND gate G3. As indicated in FIGS. 2(*h*) and 2(*l*), the trailing edge of the pulse 22 occurs at a time corresponding to the center of the bit period in which the 0 bit in the flip-flop FF1 is present. The output pulse 22 is inverted by the negative NOR gate G5 to provide a pulse 23, FIG. 2(*m*), and the pulse 23 is applied to the trigger input T of the flip-flop FF3. The flip-flop FF3 is triggered on the trailing edge of this pulse as a result of which the output $\overline{Q}$ goes from high to low, as indicated in FIG. 2(*n*). It is to be noted that this transition occurs at a time corresponding to the center of the bit period in which the 0 bit (fourth bit) in the flip-flop FF1 is present and, thus, to the center of the fourth bit period in which the 0 bit is present in the input NRZ encoded signal.

The above type of operation continues until all of the bits in the NRZ encoded signal have been processed by the data converting apparatus 1. Since this further operation proceeds in a straightforward manner, it is not believed necessary to elaborate further on this operation. FIG. 2(*n*) illustrates, however, the resultant double density encoded signal produced at the output $\overline{Q}$ of the flip-flop FF3 corresponding to the particular NRZ encoded signal illustrated in FIG. 2(*a*). For the sake of convenience in comparing the waveforms of FIGS. 2(*a*) and 2(*n*), the bits of the NRZ encoded signal of FIG. 2(*a*) are repeated below the waveform of the corresponding double density encoded signal of FIG. 2(*n*).

While there has been shown and described what is considered a preferred embodiment of the invention, it will be obvious to those skilled in the art that various changes and modifications may be made therein without departing from the invention as called for in the appended claims.

We claim:

1. A data converting apparatus for converting an NRZ encoded signal to a double density encoded signal, said NRZ signal comprising bits in corresponding bit periods, each of said bits having a first value or a second value, said data converting apparatus comprising:

first storage means adapted to receive said NRZ encoded signal and a first train of pulses, each of said pulses in the first train having a duration equal to one half of a bit period of the NRZ encoded signal, said first storage means being operative in response to the NRZ encoded signal and the first train of pulses to store in succession the bits of the NRZ encoded signal;

second storage means coupled to the first storage means and adapted to receive the first train of pulses, said second storage means being operative in response to the first train of pulses to receive and store therein in succession the bits stored in the first storage means;

first circuit means operative to produce a second train of pulses, said pulses occurring during alternate ones of the pulses in the first train of pulses, and each pulse in the second train of pulses having a duration equal to one quarter of a bit period of the NRZ encoded signal;

second circuit means operative to produce a third train of pulses displaced with respect to the second train of pulses by one half of a bit period of the NRZ encoded signal, each pulse in said third train of pulses having a duration equal to one quarter of a bit period, said pulses in the third train of pulses thereby occurring during intervening ones of the pulses in the first train of pulses;

third circuit means coupled to the first storage means and to the first circuit means, said third circuit means being operative in response to each bit of the first value being stored in the first storage means and in response to a pulse in the second train of pulses produced by the first circuit means having a first level to produce an output pulse, said output pulse occurring at a time corresponding to the end of the bit period of the bit of the NRZ encoded signal stored in the first storage means;

fourth circuit means coupled to the first storage means, the second storage means, and to the second circuit means, said fourth circuit means being operative in response to each bit of the second value being stored in the first storage means and the absence of a bit of the first value in the second storage means and in response to a pulse in the third train of pulses having a first level to produce an output pulse, said output pulse occurring at a time corresponding to the middle of the bit period of the bit of the NRZ encoded signal stored in the first storage means, said fourth circuit means being further operative to prevent an output pulse therefrom in response to a bit of the second value being stored in the first storage means simultaneously with a bit of the first value being stored in the second storage means; and fifth circuit means coupled to the third and fourth circuit means and operative in response to the output pulses produced by the third and fourth circuit means to produce an output signal, said output signal representing a double density encoded signal and having transitions therein corresponding to the times of occurrence of the output pulses produced by the third and fourth circuit means.

2. A data converting apparatus in accordance with claim 1 wherein:

the first storage means includes a flip-flop having a first input adapted to receive the NRZ encoded signal, a second input adapted to receive the first train of pulses, and a first output; and the second storage means includes a flip-flop having a data input coupled to the output of the flip-flop of the first storage means, a second input adapted to receive the first train of pulses, and an output.

3. A data converting apparatus in accordance with claim 2 wherein:

the flip-flop included in the first storage means has an additional output; and wherein:

the third circuit means includes a NAND gate having a first input coupled to the first output of the flip-flop included in the first storage means, a second input coupled to the first circuit means, and an output; and the fourth circuit means includes a NAND gate having a first input coupled to the additional output of the flip-flop included in the first storage means, a second input coupled to the output of the flip-flop included in the second storage means, a third input coupled to the second circuit means, and an output.

4. A data converting apparatus in accordance with claim 3 wherein:

the fifth circuit means includes a NOR gate having a first input coupled to the output of the NAND gate included in the third circuit means, a second input coupled to the output of the NAND gate included in the fourth circuit means, and an output.

5. A data converting apparatus in accordance with claim 4 wherein:

the fifth circuit means further comprises a flip-flop coupled to the output of the NOR gate.

6. A data converting apparatus in accordance with claim 5 wherein:

the first circuit means includes a NAND gate; and the second circuit means includes a NAND gate.

7. A data converting apparatus in accordance with claim 6 wherein:

the first and second values of bits of the NRZ encoded signal are 1 and 0, respectively.

* * * * *